Dec. 17, 1968   L. R. PEASLEE ETAL   3,417,293
REVERSE CURRENT INDICATING CIRCUIT
Filed Oct. 28, 1966   4 Sheets-Sheet 3

INVENTOR.
LAWRENCE R. PEASLEE
DAVID L. LAFUZE
BY
THEIR ATTORNEY

United States Patent Office

3,417,293
Patented Dec. 17, 1968

3,417,293
REVERSE CURRENT INDICATING CIRCUIT
Lawrence R. Peaslee and David L. Lafuze, Waynesboro, Va., assignors to General Electric Company, a corporation of New York
Filed Oct. 28, 1966, Ser. No. 590,434
6 Claims. (Cl. 317—43)

The invention relates to a system which monitors the polarity of a DC current. More specifically, the invention relates to a system which can determine a reverse direct current flow in a line.

In a direct current powered system the ability to determine reverse current flow is desirable in order to prevent damage to the power supply. It becomes imperative to determine the reverse current flow when the power supply is to be used in a system which must perform with a high degree of reliability. While there may be no problems associated with a manual monitoring of a reverse current flow, the determination becomes more difficult in a system where automated monitoring is required.

Prior art systems available for the above-described determinations may be generally characterized as requiring magnetic circuitry of considerable weight. In those applications where weight is not a factor, these systems have performed adequately. However, there is an increasing need of DC power supplies operating in systems having mobile applications. Where a high degree of mobility is necessary, heavy magnetic circuitry leaves something to be desired. Perhaps the highest degree of mobility is presently required in a space vehicle wherein the weight of any control system must be kept to an absolute minimum. Furthermore, the isolation of the system requires an automated approach for monitoring the direction of power supply current flow and a high degree of reliability.

It is an object of our invention to provide a monitor for detecting reverse current flow having a high degree of reliability.

Briefly stated, in accordance with one aspect of our invention, we provide a saturable reactor current sensing means in operative relation with the line carrying DC current and a source of excitation connected to the saturable reactor current sensing means. A gate circuit is coupled to the output of one of the windings of the saturable reactor and to the source of excitation to obtain an output indicative of the direction of current flow in the line.

Other objects and advantages of the invention will be better understood from the following description taken in connection with the accompanying drawings in which.

Figure 1:
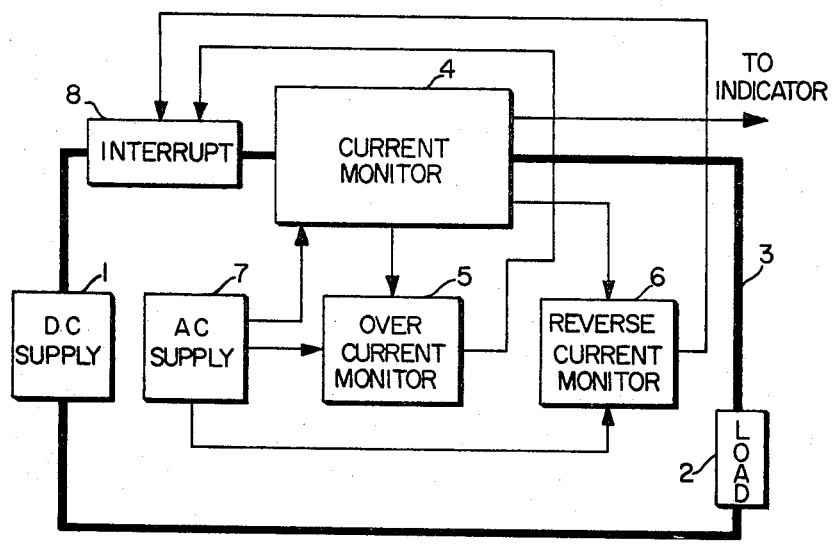
FIGURE 1 is a block diagram of a system utilizing a polarity sensitive monitor in combination with a magnitude sensitive monitor for a DC power supply.

FIGURE 1 discloses a system for monitoring current from a DC power supply 1 which supplies a load 2 through a DC line 3. The system shown is capable of polarity monitoring as well as current magnitude monitoring as is required in many applications of the invention. Since the presence of overcurrent as well as reverse current may be equally damaging to the DC power supply, both aspects are frequently monitored. However, unlike the prior art devices which would utilize a separate monitor 4 for each variable being monitored, an embodiment of the invention may utilize a single current monitor 4 to supply an overcurrent monitor 5 as well as a reverse current monitor 6. An AC supply 7 is connected to the current monitor 4, the overcurrent monitor 5, and the reverse current monitor 6 to provide an excitation function at the current monitor 4, a gating function at the overcurrent monitor 5, and a gating function at the reverse current monitor 6. Either the output from the overcurrent monitor 5 or the output from the reverse current monitor 6 is capable of interrupting the current through the line 3 at an interrupt means 8.

Figure 2:
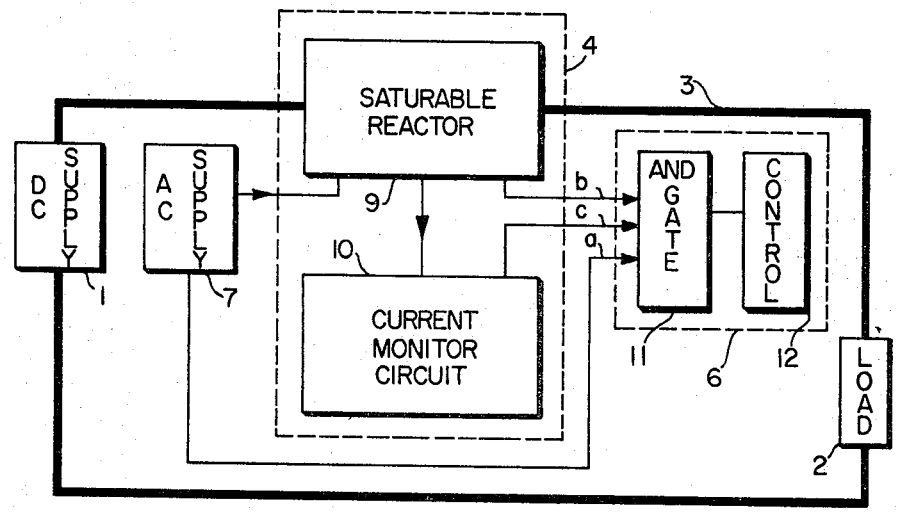
FIGURE 2 is a block diagram of a reverse current monitor and component associated therewith which provide a polarity sensitive monitor for the DC power supply.

A more detailed view of a polarity sensitive monitor is shown in FIGURE 2 wherein current monitor 4 comprises a current sensing means in the form of a saturable reactor 9. The saturable reactor produces a polarity indicative signal upon excitation by the AC supply 7. A current monitor circuit 10 is connected to the saturable reactor and provides current magnitude indicative signals irrespective of the polarity of the DC supply 1. The reverse current monitor 6 is connected to the AC supply 7 at an input "a" to effect a gating function. The saturable reactor 9 and the current monitor circuit 10 are connected to the reverse current monitor 6 at inputs "b" and "c" respectively. If suitable logic circuitry is chosen; i.e., an AND gate 11, an output may be obtained which is indicative of a reverse current flow in the line 3 at a given time providing it is above a certain threshold magnitude. The three variables, polarity, magnitude, and time, are thus supplied by the saturable reactor 9, the current monitor 10, and the AC supply 7 to the inputs "b," "c," and "a" respectively. Coincidence of signals representative of these variables will supply a signal to a control circuit 12 which may provide a number of functions including circuit interruption on the DC line 3 at the interrupt means 8 as shown in FIGURE 1.

Figure 3:
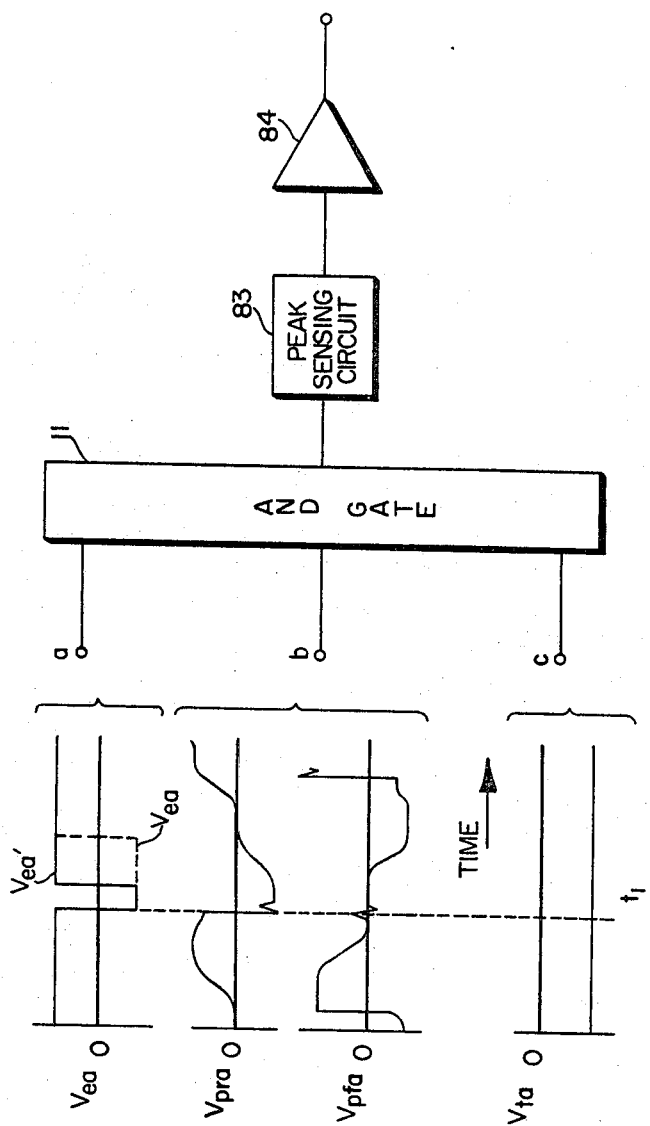
FIGURE 3 is a block diagram of a reverse current monitor with appropriate input signals for the polarity sensitive monitor of FIGURE 2.

The functioning of the AND gate 11 and the control circuit 12 may be better understood by reference to FIGURE 3 wherein the AND gate 11 is shown in combination with a subdivided control circuit 12 comprising a peak sensing circuit 83 in series with an amplifier 84. As is shown diagrammatically, a particular input signal is applied to each of the inputs "a," "b," and "c" of the AND gate 11 to obtain an output. The AND gate 11 provides an output signal when the inputs "a," "b," and "c" are driven negative with respect to respective reference voltage levels.

If a gate pulse is supplied to the input "a" in the form of a negative voltage and the DC current flowing through the line 3 is converted to a negative voltage "c" regardless of the direction of DC current flow, an output signal from the AND gate 11 may be obtained when a current of reverse polarity is flowing in the DC line 3 and that current is sensed by the saturable reactor 9 to produce a negative voltage at input "b." Thus, if a negative excitation voltage $V_{ea}$ is applied to the input "a" and a negative voltage $V_{ta}$ is simultaneously applied to the input "c" at the time $t_1$, the gate 11 will be responsive to reverse DC current flow which will produce a polarity indicative voltage $V_{pra}$ which is also negative at the time $t_1$. However, the voltage $V_{pfa}$ which is indicative of a current flow in the forward direction would not produce an output from the gate means 11 due to the narrow pulse width of the voltage $V_{ea}$.

Figure 4:
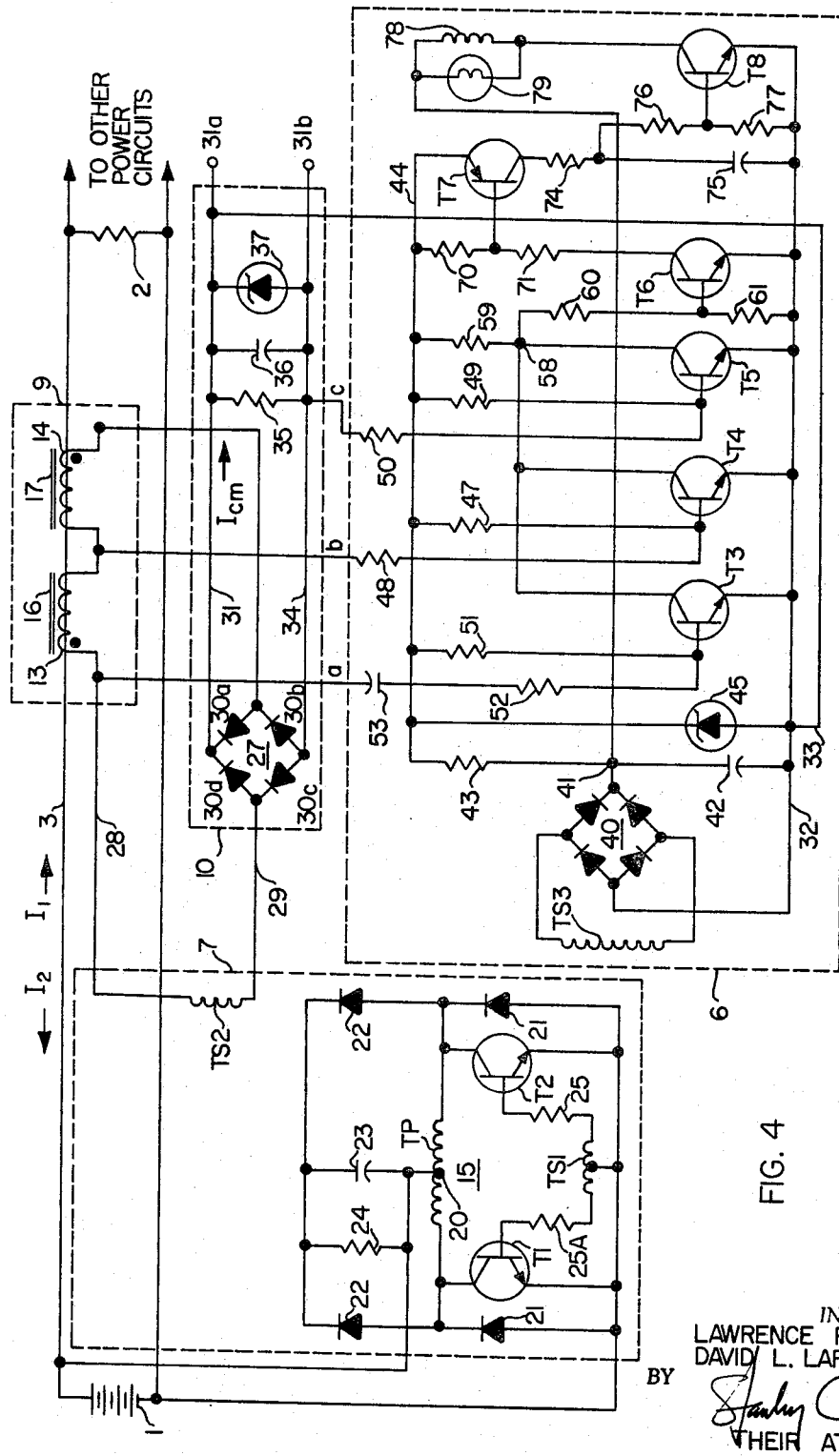
FIGURE 4 is a drawing of an embodiment of the monitor of FIGURE 2.

In order to obtain the polarity sensitive signals $V_{pra}$ and $V_{pfa}$, the saturable reactor 9 must be excited by appropriate circuitry to attain an output which varies with the direction of current flow through the DC line 3. Likewise, there must be appropriate circuitry to attain the desired gate voltage $V_{ea}$; and if a threshold is desired, circuitry must be provided to attain the voltage $V_{ta}$. An embodiment of the invention utilizing one form of this circuitry, as shown in FIGURE 4, comprises a saturable reactor 9 including a first toroidal winding 13 in series with a second toroidal winding 14 having cores 16 and 17 associated therewith and encircling a portion of the DC line 3 connecting the DC supply 1 and the load 2 to provide polarity information upon proper excitation by the AC supply 7.

The AC supply 7 comprises a conventional inverter 15 supplied by the DC power supply 1. The inverter 15 includes a first transistor T1 connected to a second transistor T2 through a transformer primary TP at the collectors of the transistors T1 and T2. The DC supply 1 is connected across transistors T1 and T2 from a center tap 20 to the common emitters. The inverter 15 includes conventional pump-back diodes 21, 22 and an input filter comprising a capacitor 23 and a resistor 24. The inverter 15 also includes a series combination connected between the bases of the transistors T1 and T2 comprising a first transformer secondary TS1 coupled to the transformer primary TP by resistors 25 and 25a. Transformer winding TS1 has its center tap connected to the common emitters to provide a current path for base-emitter current. A second transformer secondary TS2 coupled to the primary TP serves as a source of excitation signals across the first toroidal winding 13 and the second toroidal winding 14 of the saturable reactor 9. In addition to supplying the excitation signals, the second secondary TS2 provides the gate pulse to the input "a" of the gate 11. The excitation signal which is applied across the first and second windings 13 and 14 is also applied across a portion of a full wave rectifying bridge 27 through the lines 28 and 29 connected to the winding 13 and the bridge 27 respectively. Bridge 27 may serve as a basic component for further current monitoring functions.

The bridge 27 forming part of the current monitor 10 comprises diodes 30a, 30b, 30c and 30d which may be characterized as having a negligible voltage drop during conduction. The cathodes of the diodes 30a and 30d are connected to a common current monitor line 31 which is in turn connected to a common bus 32 of the reverse current monitor 6 through line 33. Although the signal $V_{pra}$ should be obtained from the voltage across the winding 14, a close approximation of this signal may be obtained from the circuit as shown since the voltage drop across the diode 30a is negligible. Similarly, the excitation voltage $V_{ea}$ is closely approximated even though a portion of the signal appearing at input "a" appears across diode 30d of the bridge 27.

The current monitor 10 includes a line 34 and a current monitor line 31 to provide terminals for a shunt combination comprising the full wave bridge 27, a resistor 35, a capacitor 36, and a breakdown diode 37. The output of the current monitor 10 is obtained by passing the rectified output current $I_{cm}$ of saturable reactor 9 through resistor 35. Capacitor 36 serves as a filter and breakdown diode 37 in parallel with resistor 35 and capacitor 36, limit the current monitor output voltage when the DC current in the line is excessive. The lines 31 and 34 may of course be connected to further instrumentation as suggested by FIGURE 1 and similarly indicated by output terminals 31a and 31b.

As may be seen by an indicated current flow path $I_{cm}$, the combination of the saturable reactor 9 and the current monitor 10 is not polarity indicative since the current flowing through line 31 is always of a polarity consistent with flow through the diodes 30a and 30d of the bridge 27. However, the signals available at the inputs "a" and "b" are polarity indicative and may be operated upon to provide an indication of that polarity.

The reverse current monitor 6 operates upon the signals to provide a polarity indication and, as shown, comprises a DC power supply including a third transformer secondary TS3 coupled to the transformer primary TP and shunts a full wave bridge 40. An output terminal 41 of the bridge 40 is connected to an RC filter combination comprising a capacitor 42 connecting the terminal 41 to the common bus 32 and a resistor 43 connecting the terminal 41 to a bias bus 44 maintained at a constant voltage by a breakdown diode 45.

The AND gate 11 includes transistors T3, T4 and T5 with each collector connected to the bias bus 44 through a resistor 59. The inputs "a," "b," and "c" are connected to the base terminals of the transistors T3, T4 and T5 by three voltage divider combinations comprising the resistors 47 and 48 with the base of the transistor T4 coupled to the junction thereof, resistors 49 and 50 with the base of the transistor T5 coupled to the junction thereof, and the resistors 51 and 52 plus a differentiating capacitor 53 connected to the base of the transistor T3 at the junction of the resistors 51, 52. Resistors 51, 47 and 49 provide the biases to establish operating levels for their associated transistors. The series RC combination comprising the resistor 52 and the capacitor 53 serves to differentiate the excitation signal $V_{ea}$ to obtain $V_{ea}'$ from input "a" to obtain a negative going pulse of sufficiently short duration to effect gating at time $t_1$ and the short interval thereafter. If voltages which are sufficiently negative to overcome the respective biases for transistors T3, T4, and T5 are applied to the inputs "a," "b," and "c" coincidentally at time $t_1$, the bases of the transistors T3, T4 and T5 will be driven negative thereby turning all transistors off, thus the voltage at 58 (the output of AND gate 11) goes positive, indicating the presence of reverse current $I_2$. If the base of any one of the transistors is not driven negative, current flow through the one transistor will maintain the voltage at 58 at essentially zero indicating no current flow in the $I_2$ direction.

If the voltage $V_{ea}$, $V_{pra}$, and $V_{ta}$ should go negative simultaneously at time $t_1$ and the short interval thereafter, the voltage level of the terminal 58 will be raised to a voltage level determined by current flow through a series circuit formed by the resistor 59 and a voltage divider comprising resistors 60 and 61.

The resistors 60 and 61 of the voltage divider are connected to the base of a transistor T6 which, in combination with a second transistor T7, forms a peak sensing circuit to lengthen the duty cycle of the output of the AND gate 11 which was necessarily shortened to effect a gating at time $t_1$ and the short interval thereafter. Transistor T7 of the peak sensing circuit 83 is suitably biased by resistors 70 and 71. The collector output of the transistor T7 is supplied to a series RC combination comprising a resistor 74 and a capacitor 75. The lengthening of the duty cycle is achieved by the fast charge of capacitor 75 via resistor 71 and the slow discharge of the capacitor 75 through the resistors 76 and 77.

The resistors 76 and 77 serve as an input circuit for the amplifier 84 comprising a transistor T8 which will provide an amplified output when the base terminal is suitably biased by current flow through the resistors 76 and 77. This current flow through resistors 76 and 77 occurs when reverse current $I_2$ is flowing in line 3 as indicated by the output from AND gate 11 and the peak sensing circuit 83. Output devices to utilize the indication of reverse current flow are shown in FIGURE 4 to include a coil 78 which may initiate interruption of conductor 3 and also an indicator light 79. The coil 78 and the indicator 79 are connected in a parallel combination in the emitter circuit of the transistor T8 which is tied back to the output 41 of the full wave bridge 40. If the coil 78 were to actuate a circuit interrupt means 8 (FIGURE 1) along the DC line 3, a current flow in the $I_2$ direction would be interrupted before DC supply 1 or load equipment is damaged. Similarly, the indicator 79 might be used to indicate the need for protective action. Also, the magnitude of current in line 3 may be observed via a meter coupled across the outputs 31a and 31b of the current monitor 10. This indication by itself or in conjunction with the actuation of light 79 may be used to determine if protective action is needed.

If it is desirable to receive a monitor signal only when the magnitude of the reverse current is above a predetermined level, the voltage $V_{ta}$ across resistor 35 which results from the current $I_{cm}$ may be used to establish for the AND gate 11 a threshold at input "c." As is shown in FIGURE 3, the voltage $V_{ta}$ is a direct voltage whose magnitude is negative for either forward or reverse current and is proportional to line current magnitude. When this voltage goes more negative than the bias established by resistors 49 and 50 transistor T5 is turned off. On the other hand, if a monitor signal is desired regardless of the amplitude of the reverse current, no input "c" to AND gate 11 is needed and the transistor T5 and associated circuitry may be omitted.

Figure 5:
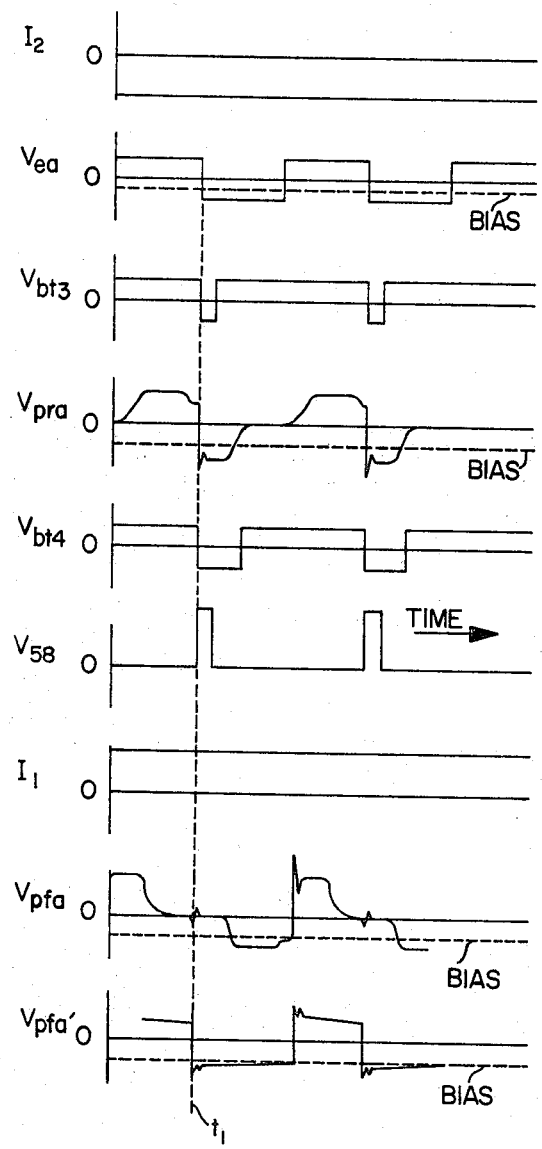
FIGURE 5 is a diagrammatic illustration of the signals at various points of the embodiment of FIGURE 4.

Since the operation of the circuitry is critically dependent upon various waveshapes at various points in the circuitry, an analysis and comparison of these waveshapes as shown in FIGURE 5 is hereby provided. Each of the waveshapes in this figure is plotted against time. The waveform $I_2$ is shown as being negative with respect to a zero current line. The waveform of the voltage $V_{ea}$ representing the excitation voltage across the windings 13 and 14 is shown as a square wave. However, any other typical alternating voltage would suffice. The waveform of the voltage $V_{ea}$ when applied to the input "a" is differentiated by an RC circuit comprising the resistor 52 and the capacitor 53 to provide a voltage $V_{bt3}$ ($V_{ea}'$) at the base of the transistor T3. The resultant waveform of the voltage $V_{bt3}$ is sufficiently negative at and only shortly after the time $t_1$ to drive the base of the transistor T3 negative thereby turning it off. With the current $I_2$ as shown, the voltage $V_{ea}$ excites the saturable reactor 9 to produce an AC voltage across the second winding 14 in the form of $V_{pra}$. If $I_2$ is sufficiently great, $V_{pra}$ will exceed the bias level indicated to establish a waveform $V_{bt4}$ at the base of transistor T4 to thereby turn it off. When the voltage $V_{ta}$, the output of the current monitor, is applied to the input "c" and is below the bias at transistor T5, this device is sufficiently negative to be turned off. Thus when the transistors T3, T4 and T5 are all off, the voltage level at the terminal 58 goes positive as shown by the waveform $V_{58}$.

Referring now to FIGURE 5, when current flow in the DC line 3 is forward as designated by the current $I_1$, the waveforms of the voltage $V_{pfa}$ across the second winding 14 differ considerably at any given time from the waveform of $V_{pra}$ when current flow is in the direction $I_2$. When a current $I_1$ is flowing, a corresponding voltage $V_{pfa}$ is applied to input "b." The waveforms of the voltage $V_{pfa}$ and the voltage $V_{pra}$ are identical except for phase and a reversal of polarity, but at the critical sampling time beginning at $t_1$ and lasting for the duration of the pulses $V_{bt3}$, the voltage $V_{pfa}$ is essentially zero thereby maintaining current flow through the transistor T4 with no output at the terminal 58 of the gate means 11.

The waveform of the voltage $V_{pfa}$ as shown corresponds to the current $I_1$ of moderate magnitude and the waveform of the voltage $V_{pra}$ as shown corresponds to the current $I_2$ of moderate magnitude. It may be seen that a zero current will produce a voltage waveform $V_{pfa}'$ which is negative during the sampling period but the input "c" will inhibit an output from appearing at AND gate 11.

Although the AND gate 11 has been utilized in an embodiment of the invention, numerous other logic alternatives are available to utilize the information at the inputs "a" and "b." For example, negative signal logic has been used in the embodiment described resulting in AND logic. However, positive logic with negative inhibit and other combinations are within the purview of those skilled in the art.

Furthermore, since a reverse current indication is desired only when reverse current is flowing and not during zero current flow the third input "c" to the logic gate has been provided to insure that an output for zero current is inhibited. In some applications, the bias level at transistor T4 may be adjusted so that an output from the logic gate does not exist for zero current. For such applications, the input "c" is again not needed.

While a specific embodiment of the invention has been described, it is intended that this embodiment be taken by way of description and not in limitation. Our invention, basically, is the detection of reverse current flowing in a line by employing the same sensor that is already present to monitor current amplitude. That portion of the output of the sensor that is indicative of reverse current flow is isolated in a logic circuit to obtain a useful indication of this abnormality.

While one embodiment of this invention has been described, many variations are possible without varying from the spirit of the invention. For example, it has been mentioned that only a close approximation of the voltage across one of the coils of the saturable reactor is obtained due to the voltage drop occasioned by diodes in rectifier bridge 27. This slight disadvantage may be alleviated by providing an extra winding coupled to one of the coils 13 or 14 to detect this voltage and another secondary winding from the source of excitation to directly provide the voltages needed at the gate 11.

While the embodiment described shows a saturable reactor with two windings, only one winding is necessary to detect reverse current flow. Also, the embodiment described utilizes the excitation voltage as a trigger for AND gate 11. The current from this source could also serve this purpose. Thus, since various embodiments of the invention are possible, it is intended that the scope of the invention be not limited by the examples described but only as determined by the appended claims.

What we claim as new and desire to secure by Letters Patent of the United States is:

1. In a system for monitoring the amplitude of direct current flowing in a line of the type in which the sensing element coupled to said line is a saturable reactor having one or more cores wherein each core has a winding, and including a source of excitation applied to said saturable reactor to derive an output therefrom that is indicative of the characteristics of said direct current, a circuit for indicating the direction of current flow comprising a gate circuit, means coupled to said source of excitation for deriving sampling pulses as a first input to said gate circuit, means coupling the voltage across one winding of said saturable reactor to said gate circuit as a second input, said gate circuit including means for establishing a threshold voltage for said second input so that an output indication of the direction of current flow is obtained from said gate circuit when a sampling pulse is at said first input and the voltage at said second input exceeds said threshold voltage.

2. In a system for monitoring the amplitude of direct current flowing in a line of the type in which the sensing element coupled to said line is a saturable reactor having one or more cores wherein each core has a winding, and including a source of excitation voltage applied to said saturable reactor to derive an output therefrom that is indicative of the characteristics of said direct current, a circuit for indicating reverse current flow comprising a gate circuit, means coupled to said source of excitation voltage for deriving sampling pulses as a first input to said gate circuit, means coupling the output voltage from one winding of said saturable reactor to said gate circuit as a second input, rectifying means coupled across the output of said saturable reactor to derive a direct voltage proportional to the amplitude of said direct current, means coupling said direct voltage to said gate circuit as a third input, said gate circuit including means for establishing threshold voltages for said second and third inputs so that an output indication of reverse current flow is obtained from said gate circuit when a sampling pulse is at said first input and the voltages at said second and third inputs exceed said threshold voltages.

3. In a system for monitoring the amplitude of direct current flowing in a line of the type in which the sensing element coupled to said line is a two core saturable reactor, wherein each core has a winding and the winding on each core is connected in series opposition with respect to the sense of the coupling of said cores to said line, and including a source of excitation voltage applied to said saturable reactor to derive an output therefrom that is indicative of the amplitude of said direct current, a circuit for indicating reverse current flow comprising a gate circuit, means coupled to said source of excitation voltage for deriving sampling pulses as a first input to said gate circuit, means coupling the voltage across one winding of said saturable reactor to said gate circuit as a second input, said gate circuit including means for establishing a threshold voltage for said second input so that an output indication of reverse current flow is obtained from said gate circuit when a sampling pulse is at said first input and the voltage at said second input exceeds said threshold voltage.

4. A circuit for detecting the direction of direct current flowing in a line comprising a saturable reactor having one or more cores coupled to said line, each of said cores having a winding, a source of alternating excitation coupled across the windings of said saturable reactor, a gate circuit, means coupled to said source of alternating excitation for deriving sampling pulses as a first input to said gate circuit, means coupling the voltage across one winding of said saturable reactor to said gate circuit as a second input, said gate circuit including means for establishing a threshold voltage for said second input so that an output indication of direction of current flow is obtained from said gate circuit when a sampling pulse is at said first input and the voltage at said second input exceeds said threshold voltage.

5. A reverse current indicator as recited in claim 4 wherein said saturable reactor has two cores and the windings thereof are coupled in series opposition with respect to the sense of the coupling of said cores to said line.

6. A circuit for indicating when the direct current in a line is flowing in reverse direction comprising a saturable reactor having two cores coupled to said line, each of said cores having a winding, the windings of said saturable reactor being connected in series opposition with respect to the sense of the coupling of said cores to said line, rectifying means coupled across said windings to derive a direct voltage proportional to the amplitude of said direct current, a source of alternating exciting voltage coupled across the windings of said saturable reactor, a gate circuit, means coupled to said source as alternating exciting voltage for deriving sampling pulses as a first input to said gate circuit, means coupling the voltage across one winding of said saturable reactor to said gate circuit as a second input, means coupling said direct voltage to said gate circuit as a third input, said gate circuit including means for establishing threshold voltages for said second and third inputs so that an output indication of reverse current flow is obtained from said gate circuit when a sampling pulse is at said first input and the voltages at said second and third inputs exceed said threshold voltages.

References Cited

UNITED STATES PATENTS

| | | | |
|---|---|---|---|
| 2,585,332 | 2/1952 | Logan | 317—43 |
| 3,223,892 | 12/1965 | Dortort | 317—43 |
| 3,366,883 | 1/1968 | Griffin et al. | 317—43 X |

LEE T. HIX, *Primary Examiner.*

J. D. TRAMMELL, *Assistant Examiner.*

U.S. Cl. X.R.

317—33; 307—88; 340—248